Sept. 5, 1972  A. A. ARMSTRONG  3,689,241
METHOD OF ABRASIVE APPLICATION TO STRAIGHT SLEEVES
Filed March 1, 1971
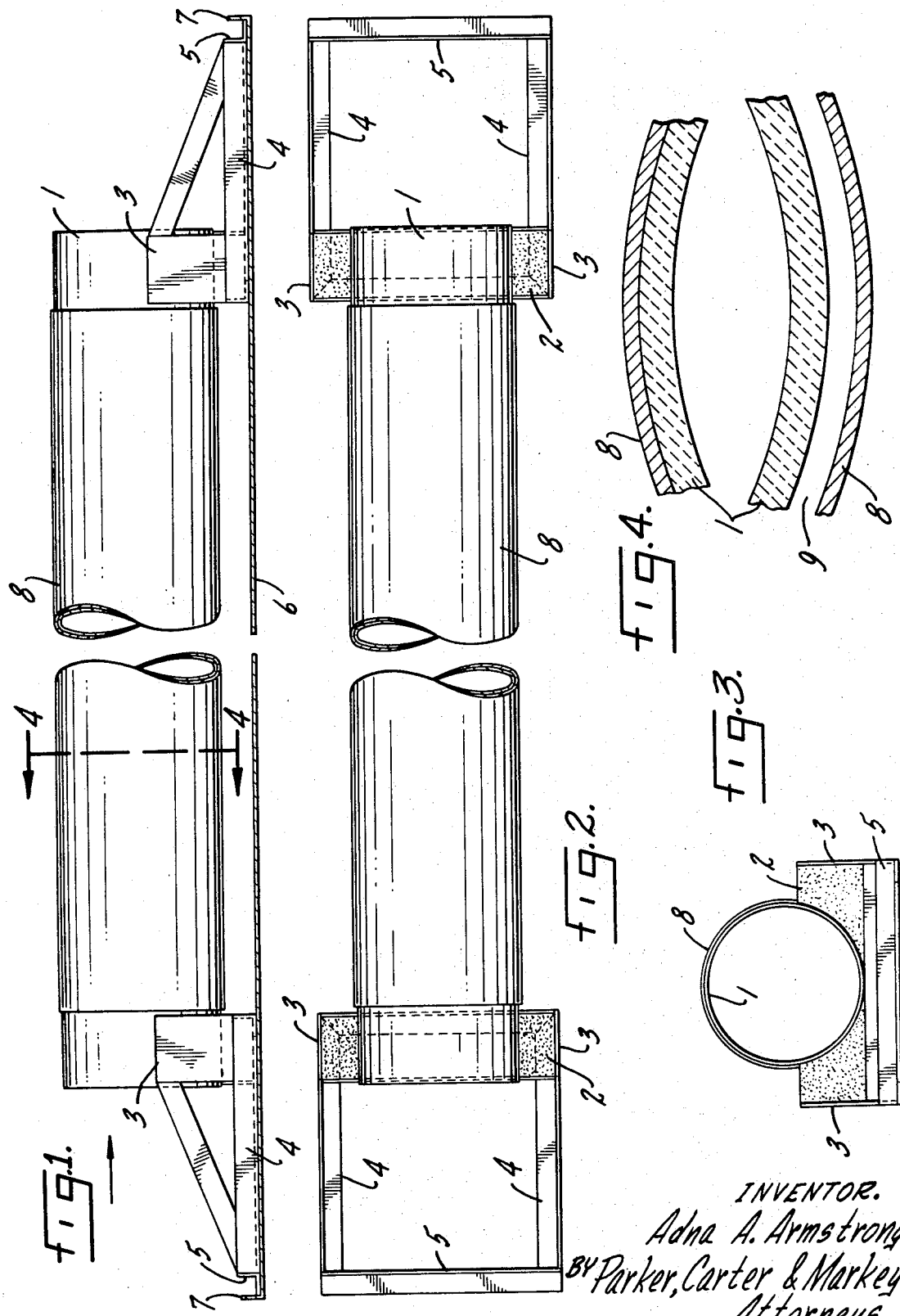
INVENTOR.
Adna A. Armstrong,
BY Parker, Carter & Markey
Attorneys.

United States Patent Office 3,689,241
Patented Sept. 5, 1972

3,689,241
METHOD OF ABRASIVE APPLICATION TO STRAIGHT SLEEVES
Adna A. Armstrong, Geneva, Ill., assignor to Amsted Industries Incorporated, Chicago, Ill.
Continuation-in-part of application Ser. No. 726,890, May 6, 1968. This application Mar. 1, 1971, Ser. No. 119,561
Int. Cl. B24d 3/00
U.S. Cl. 51—293                                                6 Claims

ABSTRACT OF THE DISCLOSURE

An apparatus and a method for securing grit to the exterior of a long thin-walled metal sleeve which ensures that the sleeve, even after being heated through a brazing cycle having temperatures as high as 2100° F., shall be straight in its final condition. By employing a ceramic support structure having a coefficient of thermal expansion less than the coefficient of thermal expansion of the sleeve, and preferably on the order of about $3.0 \times 10^{-6}$ in./in./° F. at brazing temperatures, and selected fits lying preferably in the range of $\frac{1}{8}''$ to $\frac{3}{8}''$, controlled, rectifiable distortions can be achieved which, with further processing, and possibly without further processing will result in a true, straight sleeve.

SUMMARY OF THE INVENTION

This application is a continuation-in-part of co-pending application Ser. No. 726,890, filed May 6, 1968, now abandoned.

This invention relates to a means and a method for securing grit upon the exterior of a long, thin-walled sleeve which will normally be formed of steel. Such sleeves are extensively used for the surfacing and grooving of plywood, pressed wood, asbestos board, plastic board, slate, Ruberoid and other panelled materials requiring specific and uniform surfaces. Such sleeves are currently used in lengths of about 16" to 63", and occasionally greater, and have diameters up to 9". It has for its main object to provide a means and a method for supporting the sleeve during a brazing cycle to insure that it shall remain straight without sagging or other longitudinal distortion.

It has for another object to provide a method of forming brazed steel sleeves of great length and thin wall sections which are straight from end to end.

Another object is to provide an apparatus by which a long sleeve may be suitably supported during the brazing cycle so that it will remain straight upon the completion of the brazing treatment.

Other objects will appear from time to time in the following description and claims.

DESCRIPTION OF VIEWS OF DRAWING

The invention is illustrated diagrammatically in the following drawings wherein:

FIG. 1 is a side elevation of one form of the apparatus with a tube in position, FIG. 2 is a top plan view of the structure shown in FIG. 1, FIG. 3 is an end view looking in the direction of the arrow of FIG. 2, and FIG. 4 is a view taken substantially along line 4—4 of FIG. 1 to an enlarged scale with parts omitted for clarity.

DETAILED DESCRIPTION

Like numerals will be used to designate like parts in the following description of the invention.

In the past it has been exceedingly difficult and expensive and almost impossible to make a satisfactory sanding sleeve of substantial length in a single operation in a horizontal position. In known methods, sagging in the longitudinal direction and other distortion of the grit carrying sleeve have been substantially inevitable. By the method of this invention, however, sleeves of over five feet in length and nine inches in diameter have been successfully coated with carbide grit by brazing horizontally without any appreciable distortion. Steel sleeves of the diameter disclosed and with a wall thickness of one thirty-second of an inch have been produced and satisfactorily used. The method is, however, equally applicable to sleeves of short length, such as the well known 16 inch length size.

The method of the invention is not limited to any particular brazing compound. Among the brazing procedures which have been successfully used are copper brazing and nickel-chromium-boride brazing. Tungsten carbide grit and diamonds have been used. Diamond substitutes may likewise be used, though it will be appreciated that the use of diamonds and diamond substitutes is limited due to cost.

The invention is not limited to any particular arrangement of grit. The fineness, grading, selection and spacing of grit together with the desired contour of the tube determine the finish which will be given to the material upon which the sanding tool acts. Any desired arrangement of grit may be employed such as straight walls or controlled valley grooves which result in surfaces resembling machined tongue and groove panelling or a striated, driftwood effect.

A general description of the method of the present invention is as follows:

A steel sleeve approximately nine inches in diameter and sixty-three inches in length, having a wall thickness of one thirty-second of an inch, was placed upon a ceramic tube which was itself supported at its ends upon cradles formed of ceramic material and a heat resistant metallic alloy. The two cradles carrying the ceramic tube and the steel sleeve were placed on a tray. The sleeve was coated with carbide abrasive particles with a brazing paste and the entire assembly was moved to a brazing furnace and subjected to temperatures ranging from 2000° F. to 2100° F. After completion of the brazing, the assembly was removed from the furnace and, upon cooling, it was found that the sleeve was completely straight and that it could readily be removed from the ceramic tube and the the carbide grit particles had been properly brazed to the exterior of the sleeve. The brazing was carried out when the tube and the sleeve were in a horizontal position.

A particular embodiment of the invention is illustrated in the drawings which will now be described.

As shown in FIGS. 1 and 2, a ceramic tube 1 is supported at each end in a cradle of fire brick having a base 2. This base, as shown in FIG. 3, comprises the fire brick portion 2 which is supported in a frame comprising side members 3 secured to two longitudinal members 4, 4, which in turn are joined at their outward ends by a transverse member 5. Each of the supporting frames formed by members 3, 4 and 5, are positioned at an end of the ceramic tube and upon a tray 6, which is provided with upstanding edges 7. Members 3, 4, 5 and 6 are preferably made of a metallic alloy which is of high heat resistant qualities though this is not essential since the primary purpose of the aforesaid sleeve and mandrel supporting structure is to permit the entire assembly to be handled as a unit to and through the heating furnace where brazing is carried out.

As shown in FIGS. 1, 2 and 3, the metallic sleeve 8 is positioned upon the ceramic tube 1 so as not to contact any part of the support or cradle formed by the members 3, 4 and 5. Thus, all parts of the exterior of the sleeve are free of any contact with the supporting structure which carries the ceramic tube, and therefore all parts of the metallic sleeve during brazing treatment are exposed freely to the atmosphere within the furnace. No contact of the sleeve with any other member which would interfere with the brazing is possible. The steel tube to be abrasive coated and copper or nickel-chrome-boride brazed is placed over the ceramic tube and coated with the brazing paste or lacquer of which the brazed material may be a part or to which the brazed material may be added together with the abrasive grain.

As best seen in FIG. 4, a clearance 9 is provided between the tube or mandrel 1 and the sleeve 8. In this instance the clearance is about ⅛". A clearance of this magnitude will usually be quite sufficient to enable a cold sleeve to be placed on a hot, expanded mandrel. Since the coefficient of thermal expansion of the sleeve will usually be about twice that of the mandrel, the possibility of distorting interference during treatment is avoided.

The ceramic tube could be a solid member instead of a hollow tube. For reasons of economy, it is generally preferable that it be a tubular member. The tube is preferably formed from mullite, a silicate of aluminum ($3Al_2O_3$, $2SiO_3$) very similar to sillimanite which is formed at high temperatures from aluminous clay mixtures. A commercial product composed of mullite porcelain having an alumina content of about 63.5% formed by slip casting and having a coefficient of linear thermal expansion of about $3.0 \times 10^{-6}$ in./in./° F. at brazing temperatures in the range of 2000°–2100° is quite suitable. Another commercial high mullite product containing about 70.5% alumina and having a coefficient of linear thermal expansion of about $3.2 \times 10^{-6}$ in./in./° F. at the aforesaid brazing temperatures may also be used. Both the aforesaid materials have good thermal shock resistance. The tubes, may, for example, be about ¼" to ⅜" thick, up to about 8¾" in diameter, and as long as 70".

The sleeves may be formed from a wide variety of steels, including the full range of carbon steels (or at least from about SAE 1006 to SAE 1090), the low alloy steels (including specifically the 4000, 5000, 8000 and 9000 series), and even stainless steels, particularly the 300 and 400 series. In the case of stainless steels brazing should be carried out under a hydrogen or other protective gas. In the case of the low carbon steels, an endothermic gas may be used to advantage during brazing. From the foregoing listing of sleeve materials it will be noted that the coefficient of linear thermal expansion of the sleeve will be in the range of about $5.5 \times 10^{-6}$ to $7.2 \times 10^{-6}$ in./in./° F. for the low carbon and alloy steels, ranging up to about $10.0 \times 10^{-6}$ for certain stainless steels.

The clearance between the sleeve and ceramic mandrel is preferably in the range of from about ⅛" to ⅜" based on diameter, though in the case of very large diameter sleeves the differential may range up to about 1". It is preferred that the clearance be in the ⅛" to ⅜" range, and preferably near the lower end of the range to achieve minimum distortion and maximum ease of truing in the succeeding rolling or balling operation. Because of the thinness of the wall of the sleeve, which may very from about .007" to about .250" an elliptical or pear-shaped cross section will nearly invariably result from the brazing process.

The sleeve should be slightly loose upon the tube or other support and this is the procedure used in current practice. When this is the case, radial distortion occurs as a result of the heating, the degree of radial distortion depending on several factors including wall thickness, sleeve composition, temperature and time. No longitudinal distortion will occur because the tube or other support will not sag and is so shaped as to prevent any longitudinal distortion of the sleeve which is thus held at all times so that it is longitudinally straight. The radial distortion is corrected after brazing by submitting the sleeve to the action of rollers which return it to a truly round cross section. Since at the time of rolling the grit is present on the exterior of the sleeve, a yielding mat or other yielding member is so positioned as to cushion and protect the grit to prevent its destruction, distortion or removal. Alternately, the brazed, irregularly shaped cross section sleeve may be trued by forcing a ball or other truing member through it. These and equivalent procedures may be described as a truing operation.

It should be understood that if the clearance can be maintained at minimal levels, the subsequent truing operation may be avoided, especially if the user takes pains to assemble the sleeve to the sanding arbor with great care.

The invention is not limited to any particular construction of a support or cradle for carrying the ceramic tube. Since the support or cradle is subjected to the brazing heat, it is essential that it be made of material capable of withstanding high temperatures without breakdown or major distortion. Preferably therefore, the supporting cradle is formed of a ceramic material. Any material which is capable of supporting the ceramic tube and the metallic sleeve and is also capable of sustaining the high temperatures necessary for brazing and doing so without breakage or substantial distortion may be utilized for the supporting members 3, 4, 5, and 6.

The expression "potentially adhesive" is used in some of the claims because it is recognized that a brazing material or other compound though not adhesive in a cold state, become adhesive when sufficiently heated. Hence the materials which bind the grit to the sleeve are properly described as being potentially adhesive.

It is known from past experience that if it is attempted to braze long sleeves in a vertical position, a deep furnace is required and "chimney effects" become a problem in the proper accurate control of brazing temperatures. Other undesired results which occur from brazing long sleeves in a vertical position are a sagging or "washing" of the brazing material together with a migration of the carbide particles or an actual "sinking" of the steel sleeve because of these inevitable defects. Attempts to provide carbide grit on long sleeves by brazing in a vertical furnace have not been successful and it is generally known that the difficulties mentioned are increased as the length of the sleeve is increased. Hence the sleeves must be treated in a horizontal position, or at least in a substantially horizontal position, the maximum, tolerable angle of inclination being that angle beyond which washing of the brazing material, migration of the grit particles, and/or sinking of the sleeve commences.

Whatever material is used for brazing or grazing and whatever grit is used, the tube upon which the grit is secured passes through the heating cycle without appreciable distortion so that it remains straight and is effective for use in the treatment of flat surfaces.

Although a preferred mode has been illustrated and described, and other modes further described, it will be apparent that changes may be made by those skilled in the art without departing from the spirit of the invention. Accordingly, it is intended that the scope of the invention be defined not by the foregoing exemplary description, but rather by the scope of the hereafter appended claims when interpreted in light of the pertinent prior art.

I claim:

1. In a method of producing a longitudinally straight, surface texturing steel sleeve having an abrasive coating the steps of assembling a thin walled aluminum silicate tube structure into a non-coated steel base sleeve, said thin walled tube structure being structurally self-supporting at all temperatures to which it is subjected during processing whereby said thin walled tube structure provides a non-sagging support for said base sleeve, said thin walled tube structure extending continuously through said non-coated base sleeve from end to end thereof, said thin walled tube structure extending outwardly at each end of said non-coated base sleeve a distance sufficient to provide unimpeded longitudinal expansion of said non-coated base sleeve during a subsequent heating step, said thin walled tube structure having an external diameter slightly less than the internal diameter of said non-coated base sleeve, said tube structure having a lesser coefficient of thermal expansion than the said non-coated base sleeve, whereby said non-coated base sleeve is slightly loosely carried by said tube structure and thereby able to uninhibitedly expand and contract at different rates and to different degrees with respect to said thin walled tube structure, supporting said thin walled tube structure from each end at locations spaced from the ends of said non-coated base sleeve a distance sufficient to provide uninhibited longitudinal extension of said non-coated base sleeve, applying to the non-coated base sleeve abrasive particles and brazing metal for adhering said abrasive particles to said base sleeve, subjecting the abrasive particle coated base sleeve to adhering temperatures, and thereafter cooling said abrasive particle coated base sleeve.

2. The method of claim 1 further including the step of subjecting the aforesaid abrasive particle coated base sleeve to a roller treatment for imparting a circular cross section to the product.

3. The method of claim 1 further characterized in that the abrasive particle coated base sleeve is subjected to a temperature in the range of about 2000° F. to 2100° F.

4. The method of claim 1 further including the step of truing the aforesaid abrasive particle coated base sleeve by a balling operation to impart a circular cross section to the final product.

5. The method of claim 1 further characterized firstly, in that the coefficient of linear thermal expansion of the base sleeve is about twice as great as the coefficient of linear thermal expansion of the tube structure and secondly, in that the clearance between the tube structure and the base sleeve is greater than about 1/8".

6. The method of claim 1 further characterized firstly, in that the base sleeve is formed from a material selected from the group consisting of the carbon steels, the low alloy steels and the stainless steels, and secondly, in that the tube structure is composed of a ceramic material containing approximately 2/3 alumina.

References Cited
UNITED STATES PATENTS

| | | | |
|---|---|---|---|
| 2,476,699 | 7/1949 | Cline | 51—309 |
| 2,083,793 | 6/1937 | Price | 51—372 |
| 2,734,321 | 2/1956 | Field | 51—375 |
| 2,796,706 | 6/1957 | Anderson | 51—309 |
| 3,027,692 | 4/1962 | Field | 51—375 |

DONALD J. ARNOLD, Primary Examiner

U.S. Cl. X.R.

51—309